United States Patent Office 3,520,049
Patented July 14, 1970

1

3,520,049
METHOD OF PRESSURE WELDING
Dmitry Nikolaevich Lysenko, Ulitsa Galaktionovskaya 191, kv. 15; Valerian Vladimirovich Ermolaev, Ulitsa Krasnoyarskaya 135, kv. 4; and Anatoly Alexeevich Dudin, Ulitsa Elektrofitsirovannaya 133, kv. 22, all of Kuibyshev, U.S.S.R.
Filed Oct. 12, 1966, Ser. No. 586,094
Claims priority, application U.S.S.R., Oct. 14, 1965,
1,032,128, 1,032,138
Int. Cl. B23k *31/02*
U.S. Cl. 29—497.5                    3 Claims

ABSTRACT OF THE DISCLOSURE

A method of pressure welding is based on the use of forces of interaction of magnetic fields, produced by an inductor through which an impulse of great intensity current is passed. The parts to be welded are positioned in spaced relation at an angle therebetween and the method can be used for obtaining overlapping welded joints of thin-walled parts having different thickness and made from different materials without melting, the resulting joints not requiring any further mechanical treatment.

---

The present invention relates to methods of pressure welding, and more particularly to methods of pressure welding with the use of an impulse loading of parts to be welded by using forces of interaction of electromagnetic fields.

The invention may be successfully employed when welding tubular and sheet metal structures. The parts to be welded may be thin-walled or may have walls of different thicknesses, one of said parts even may be of an unlimited thickness.

Known in the prior art are methods of pressure welding with the use of an impulse loading of parts to be welded by using forces of interaction of electromagnetic fields, produced by an inductor, through which an impulse of great intensity current is to be passed (see the works of the Interlaboratory of Electrohydraulic Effect, Leningrad).

When employing this method, the impulse loading of the parts is effected by forces of interaction of electromagnetic fields, produced by an inductor, which is adjusted in such a manner as to embrace the both parts to be welded near the joint therebetween. The butting ends of the parts to be welded are pressed together by an axial force, set up by the aid of an additional device. When passing an impulse of great intensity current through the inductor, electromagnetic fields, produced thereby, interact and cause a volumetric compression of the parts near the joint therebetween, thus achieving butt welding.

The volumetric compression of the parts is conducive, in turn, to the plastic flow of metal of the surfaces to be joined, which results in the formation of a burr.

Disadvantages of the existing methods are as follows: the necessity of an additional axial compression of the parts to be welded, which is likely to considerably complicate the welding arrangement; the need for further machining of the article obtained to remove the burr.

The known methods are not suitable for welding thin-walled parts or those of varying thicknesses, because the application of forces, causing the volumetric compression, is conducive to warping of the thin-walled parts.

2

In conformity with what has been said above, an object of the present invention is to eliminate the above-mentioned disadvantages.

Another object of the present invention is to provide a method of pressure welding with the use of an impulse loading of parts to be welded by using forces of interaction of electromagnetic fields, which would allow effecting the welding of thin-walled parts.

Another important object of the present invention is also to provide a method of the same type, which would allow welding of parts with walls of various thicknesses.

A still further object of the present invention is also to provide a method of pressure welding, permitting elimination of the subsequent machining of parts to be welded.

Yet another important object of the present invention is to provide a method of pressure welding, characterized by a high productive capacity with a high quality of the welded joints thus obtained.

In conformity with said and other objects, in the proposed method of pressure welding with the use of an impulse loading of the parts to be welded by using forces of interaction of electromagnetic fields, produced by an inductor, through which an impulse of great intensity current is passed, according to the present invention, the parts to be welded are disposed in such a manner that their surfaces to be welded are disposed one relative to another so as to overlap each other at an acute angle and with the provision of a certain angle therebetween, while the inductor is disposed on at least one of said parts on the surface opposite the surface being welded, with a view of inducing in this part an electromagnetic field.

In the case of welding parts of materials with differing plastic properties, the welding process is effected with a preheat of the part whose material is less ductile, while the inductor is provided thereby on the other part.

The proposed method of welding provides for the overlap welding of thin-walled parts and those with walls of differing thicknesses, and does not require the subsequent machining of the welded article thus obtained.

Additionally, the proposed method may be employed for welding parts of materials having various plastic properties.

The nature of the present invention will further become more fully apparent from a consideration of the following description thereof, taken in conjunction with the accompanying drawing, in which:

FIG. 1 diagrammatically shows the arrangement of the parts to be welded in the inductor according to the present invention;

Figure 1:
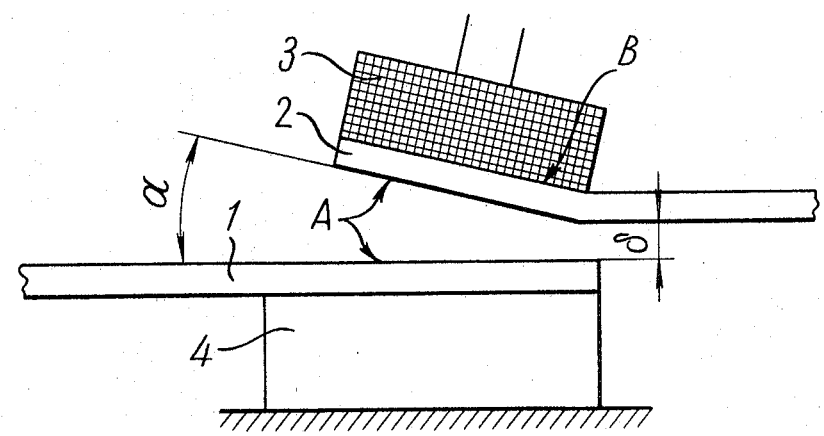

In conformity with the proposed method, parts 1 and 2 (FIG. 1) are disposed in such a manner that their surfaces A, (which have been subjected to a prior degreasing and cleaning) are disposed relative to one another so as to overlap with an acute angle α and with a gap σ therebetween.

An inductor 3 is provided on part 2 on the surface B thereof opposite the surface A to be welded, with a view of inducing in the part 2 an electromagnetic field all over the whole surface B, equal to the surface area of the surface to be welded A. When welding parts of different thicknesses, it is expedient to provide the inductor on the part of a smaller thickness.

The part 1 is rigidly secured on a stationary member 4 of the welding arrangement.

The part 2 is secured so as to allow its end being welded to be moved in the direction of the part 1.

The inductor 3 is connected to a generator of impulse currents of great intensity.

When passing an impulse of great intensity current through the inductor 3, the electromagnetic field produced therein induces in the part 2, on which is provided the inductor 3, eddy currents, inducing therein an electromagnetic field.

Forces of interaction of the electromagnetic fields of the inductor 3 and parts 2 produce an impulse loading thereof, pushing this part away from the inductor in the direction of the part 1.

Since the surface to be welded A of the part 2 is disposed at an angle α to the surface A to be welded of the part 1 and with the provision of a certain gap σ, therebetween the collision of parts 1 and 2 produces a component force directed along the surfaces to be welded, which causes their mutual shift.

This providets for setting up strong metallic bonds between the surfaces to be welded of the parts 1 and 2.

The proposed method may be successfully employed for welding thin-walled parts and those with walls of different thicknesses.

An exemplary embodiment of an arrangement of the parts to be welded and the inductor is given below.

EXAMPLE 1

Figure 2:
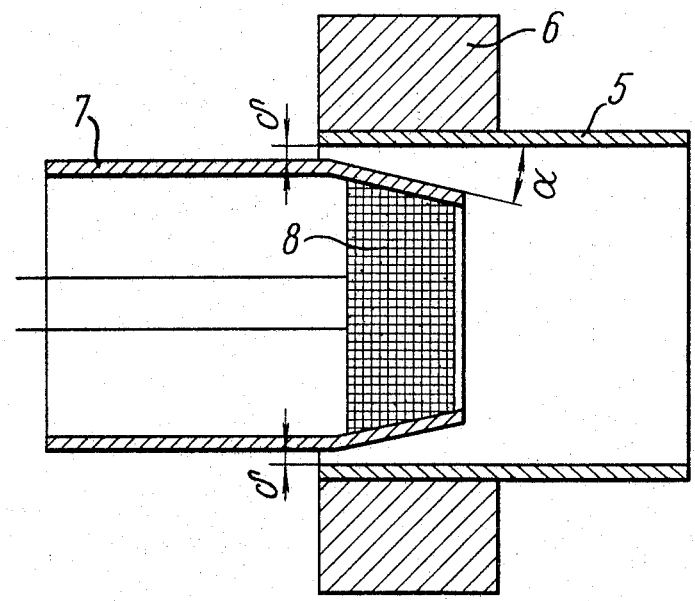
FIG. 2 is a longitudinal section diagrammatically showing an arrangement for the welding of thin-walled pipes with the inductor disposed therein.

When welding thin-walled pipes, one of them, namely, pipe 5 (FIG. 2) is rigidly secured in a die 6, while at the end of another pipe 7 there is formed a truncated cone, accommodating the inductor 8. Then the pipe 7 is inserted with its truncated cone into the pipe 5 so as to provide a gap σ therebetween.

Hence, the surfaces of to be welded of the pipes 5 and 7 are disposed one above another at an angle α to each other.

The welding process is effected in a manner similar to that which has been described above.

For welding an aluminum pipe 50 mm. in diameter and with a wall thickness of 1 mm. to an aluminium pipe 54 mm. in diameter and with a wall thickness of 1 mm., their surfaces to be welded are disposed at an angle $\alpha=7°$ and with the gap $\sigma=1.0$ mm. therebetween. The power as required for welding said pipes equals 15 kJ., while the inductor voltage is equal to 10 kv.

Under these conditions of welding, there has been obtained a hermetic welded joint of a high mechanical strength, capable of resisting vibrational loads.

EXAMPLE 2

Figure 3:
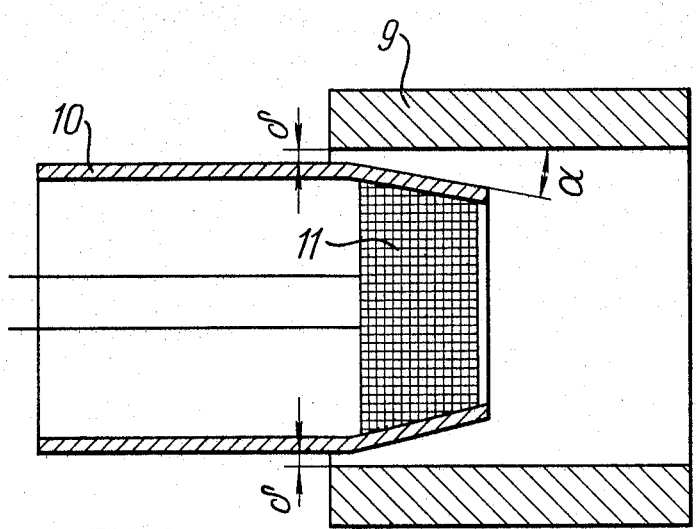
FIG. 3 is a longitudinal section diagrammatically showing an arrangement of parts to be welded with walls of different thicknesses with the inductor disposed therein.

When welding pipes of different wall thicknesses, one of them, preferably the thick-walled pipe, namely, pipe 9 (FIG. 3), is rigidly secured, while at the end of another pipe, namely, pipe 10, there is formed a truncated cone accommodating an inductor 11. Then the pipe 10 is inserted with its truncated cone into the pipe 9 so as to provide the gap σ therebetween. In such a manner, the surfaces to be welded of the pipes 9 and 10 are disposed one adjacent the other at an angle α.

For welding an aluminum pipe 50 mm. in diameter and with a wall thickness of 1 mm. to an aluminium pipe 100 mm. in diameter and with the wall thickness of 24 mm. the surfaces to be welded are disposed at an angle $\alpha=7°$ and with the gap $\sigma=1.0$ mm. therebetween. The power as required for welding said pipes amounts to 15 kJ., while the inductor voltage is equal to 10 kv. Under these conditions, there has been obtained a hermetic welded joint of high mechanical strength, capable of resisting vibrational loads.

EXAMPLE 3

Figure 4:
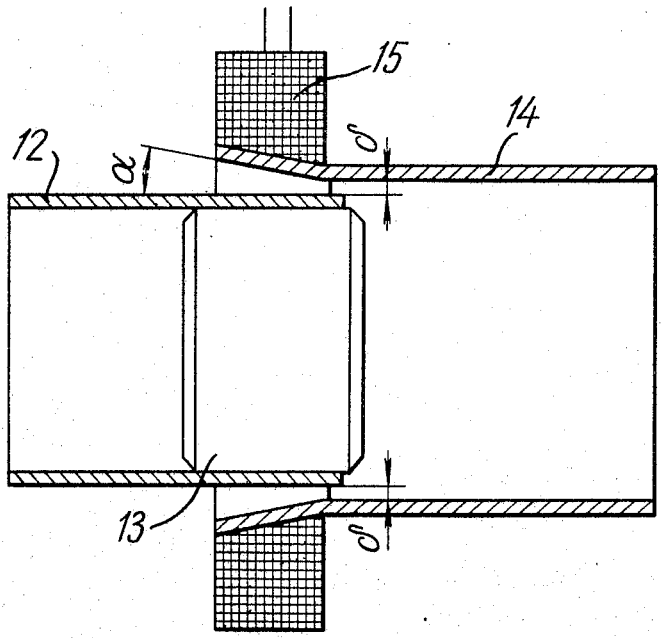
FIG. 4 is a longitudinal section diagrammatically showing an arrangement of thin-walled pipes to be welded with the inductor disposed therein.

When welding thick-walled pipes, one of them, namely, pipe 12 (FIG. 4), is rigidly secured on a mandrel 13, while at the end of the other pipe, namely, pipe 14, there is formed a conical flanging, onto which an inductor 15 is fitted. Then the pipe 14 is mounted over the pipe 12 so as to provide a gap σ therebetween. In such a manner, the surfaces to be welded of the pipes 12 and 14 are disposed adjacent one another at an angle α.

For welding an aluminum pipe 50 mm. in diameter and with a wall thickness of 1 mm. to an aluminium pipe 53 mm. in diameter and with a wall thickness of 1 mm. their surfaces to be welded are disposed at an angle $\alpha=7°$ and with the gap $\sigma=0.5$ mm. therebetween. The power as required for welding said pipes equals 20 kJ., while the inductor voltage is equal to 10 kv. Proceeding in such a manner, a hermetic welded joint is obtained which is capable of resisting vibrational loads.

EXAMPLE 4

Figure 5:
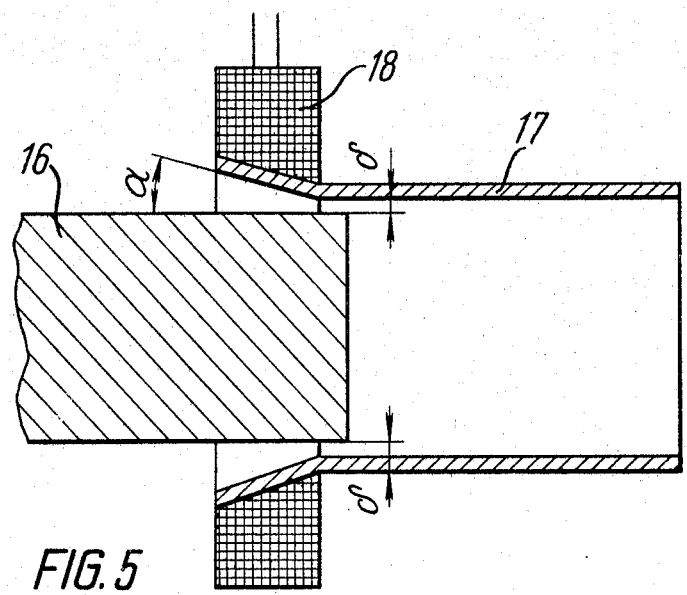
FIG. 5 is a longitudinal section diagrammatically showing an arrangement of parts to be welded with walls of different thicknesses, with the inductor disposed therein.

When welding parts of different thicknesses, one of them, preferably the part of greater thickness, namely, rod 16 (FIG. 5), is rigidly secured, while at the end of the other part, namely, pipe 17, there is formed a conical flanging, onto which is fitted an inductor 18. When the pipe 17 is mounted over rod 16 providing a gap σ therebetween. In such a manner, the surfaces to be welded of the parts, rod 16 and pipe 17, are disposed adjacent one another at an agle α therebetween.

When welding an aluminum pipe 50 mm. in diameter and a wall thickness of 1 mm. to an aluminum rod 47 mm. in diameter, their surfaces to be welded are disposed at an angle $\alpha=7°$ and with the gap $\sigma=0.5$ mm. therebetween.

The power required for welding said parts, amounts to 20 kJ., while the inductor voltage equals 10 kv. In such a manner, a hermetic welded joint has been obtained, capable of resisting vibrational loads.

EXAMPLE 5

The proposed method may be successfully employed for welding parts of materials with different plastic properties. In such a case, the welding is performed with preheating of the part, whose material is less ductile, while the inductor is mounted on the other part.

When welding pipes of stainless steel (containing 18 percent chromium and 10 percent nickel) 57 mm. in diameter and a wall thickness of 3 mm. to a pipe of aluminum 50 mm. in diameter and a wall thickness of 1.5 mm., their surfaces to be welded are disposed at an angle $\alpha=7°$ and with the gap $\sigma=0.5$ mm., therebetween, the temperature of the stainless steel being 400 to 450° C. The power required for welding said pipes amounts to 15 kJ., while the inductor voltage equals to 10 kv. In such a manner, a hermetic welded joint has been obtained, capable of resisting vibrational loads.

The welding process, to be carried into effect according to the proposed method, is controlled in an easy and simple manner; it is characterized by a high productive capacity with a high quality of the welded joints thus obtained; it readily responds to automation and provides for sanitary conditions at the working place. To form the welded joint calls for a considerably smaller consumption of electric power as compared with that as required by other existing methods.

Since there are possible a great number of variants in realizing the method as disclosed above, as well as various embodiments thereof, it must be taken into account that the data as specified in the present description is to be considered as reference material only, and does not limit the scope of this invention.

What is claimed is:

1. A pressure welding method comprising positioning parts to be welded such that the surfaces thereof to be welded are adjacent one another in overlapping spaced relation and at an acute angle therebetween, one of said parts being nickel-chromium stainless steel and the other aluminum, heating the steel part to a temperature of 400–450° C., placing an inductor of an electromagnetic field on at least the aluminum part on a surface thereof opposite that which is to participate in the welding, and energizing said inductor to pass an impulse of great intensity current therethrough to induce interacting electromagnetic fields in said parts to produce an impulse loading of the parts and consequent pressure welding of the surfaces thereof.

2. A method as claimed in claim 1 wherein said acute angle is about 7°.

3. A method as claimed in claim 1 wherein said parts have circular cross-sections to produce an annular joint, and said inductor is formed as an annular member coextensive with said joint.

References Cited

UNITED STATES PATENTS

| | | | |
|---|---|---|---|
| 3,197,855 | 8/1965 | Carter et al. | 29—470.1 |
| 3,212,183 | 10/1965 | Burman et al. | 29—421 X |
| 3,263,323 | 8/1966 | Maher et al. | 29—470.1 |
| 3,264,731 | 8/1966 | Chudzik | 29—486 |

OTHER REFERENCES

High-Energy-Rate Forming by R. W. Carson, Product Engineering, Oct. 15, 1962, p. 87.

PAUL M. COHEN, Primary Examiner

U.S. Cl. X.R.

29—421, 470.1